Figure 1:
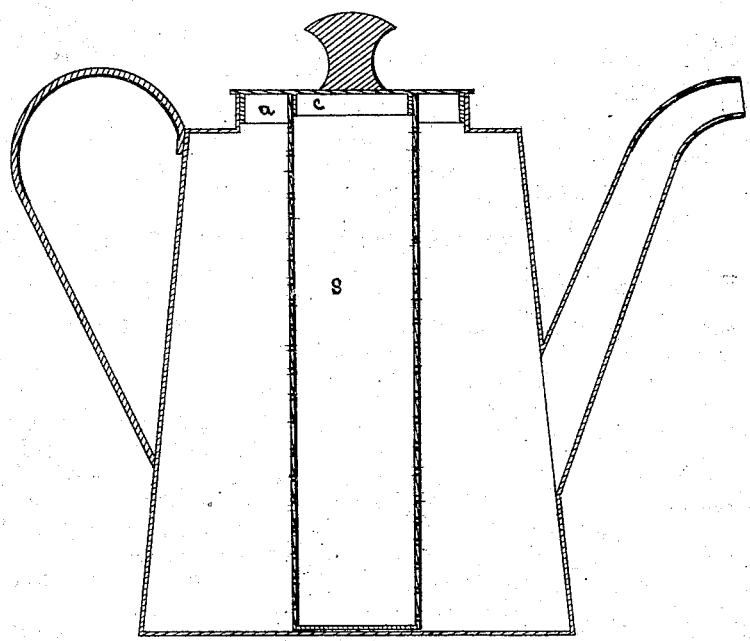

J. W. BREWSTER.
TEA-POT.

No. 173,713. Patented Feb. 22, 1876.

Witnesses
A. B. Griffin
G. W. Low

Inventor
John W. Brewster
by Bradford Howland
his Attorney.

UNITED STATES PATENT OFFICE.

JOHN W. BREWSTER, OF KENT, OHIO.

IMPROVEMENT IN TEA-POTS.

Specification forming part of Letters Patent No. 173,713, dated February 2?, 1876; application filed July 31, 1875.

*To all whom it may concern:*

Be it known that I, JOHN W. BREWSTER, of Kent, Portage county, Ohio, have invented certain Improvements in Tea-Pots, of which the following is a specification:

The nature of my invention relates to a tea-pot containing a perforated vessel which holds the tea-leaves, and is attached to the inside of the tea-pot cover.

Figure 1 is a vertical section of the tea-pot.

The vessel $s$ is used to hold the tea. This vessel is perforated, or so constructed as to hold the tea, and at the same time allow the water in the tea-pot to pass in and out of the vessel. It is cylindrical in form, which is preferable, though it may be of any shape. Its upper end is open when detached from the tea-pot, but when in use it is attached to the inside or bottom of the tea-pot cover, which closes the open end of the vessel $s$. It is held in position by the flange $c$ on the inside of the cover $a$.

The tea is put in the perforated vessel $s$, which is then attached to the bottom of the cover $a$ by means of the flange $c$.

While the decoction is being made, and when it is poured from the spout, the vessel $s$ retains the tea.

The vessel $s$ may also be used in making coffee.

I claim as my invention—

In a tea-pot, the combination of an imperforate cover, provided with flanges $a$ $c$, with the perforated cylinder $s$, which rests on the bottom of the pot, while its top is detachably secured to the flange $c$ of the cover, substantially as and for the purpose specified.

JOHN W. BREWSTER.

Witnesses:
 BRADFORD HOWLAND,
 FRANK W. CONE.